(12) United States Patent
Kasako et al.

(10) Patent No.: US 7,975,116 B2
(45) Date of Patent: Jul. 5, 2011

(54) REMOTE STORAGE DISK CONTROL DEVICE AND METHOD FOR CONTROLLING THE SAME

(75) Inventors: Naohisa Kasako, Odawara (JP); Shuji Kondo, Odawara (JP); Toru Suzuki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/720,714

(22) Filed: Mar. 10, 2010

(65) Prior Publication Data

US 2010/0169598 A1 Jul. 1, 2010

Related U.S. Application Data

(63) Continuation of application No. 12/071,325, filed on Feb. 20, 2008, now Pat. No. 7,707,377, which is a continuation of application No. 11/492,892, filed on Jul. 26, 2006, now Pat. No. 7,363,461, which is a continuation of application No. 11/087,983, filed on Mar. 22, 2005, now Pat. No. 7,165,163, which is a continuation of application No. 10/748,886, filed on Dec. 30, 2003, now Pat. No. 7,219,201.

(30) Foreign Application Priority Data

Sep. 17, 2003 (JP) ................. 2003-325082

(51) Int. Cl.
*G06F 12/00* (2006.01)
(52) U.S. Cl. ...................................... 711/162
(58) Field of Classification Search .......................... None
See application file for complete search history.

(56) References Cited

U.S. PATENT DOCUMENTS

| | | | |
|---|---|---|---|
| 3,771,137 A | 11/1973 | Barner et al. | |
| 4,025,904 A | 5/1977 | Adney et al. | |
| 5,155,845 A | 10/1992 | Beal et al. | |
| 5,408,465 A | 4/1995 | Gusella et al. | |
| 5,459,857 A | 10/1995 | Ludlam et al. | |
| 5,504,882 A | 4/1996 | Chai et al. | |
| 5,548,712 A | 8/1996 | Larson et al. | |
| 5,680,580 A | 10/1997 | Beardsley et al. | |
| 5,680,640 A | 10/1997 | Ofek et al. | |
| 5,692,155 A | 11/1997 | Iskiyan et al. | |

(Continued)

FOREIGN PATENT DOCUMENTS

EP 0869438 10/1998

(Continued)

OTHER PUBLICATIONS

"Introduction to Storage Pooling, Consolidation Storage Resources with DataCore SANsymphony Software", White Paper, DataCore Software, updaged Jul. 2003, pp. 1-8.
"SAN Virtualization Guidelines", DataCore Software Corporation, 2000, pp. 1-9.
Sarkar et al, "Internet Protocol storage area networks" IBM Systems Journal, 2003, vol. 42, No. 2, pp. 218-231.

(Continued)

*Primary Examiner* — Brian R Peugh
(74) *Attorney, Agent, or Firm* — Mattingly & Malur, PC

(57) ABSTRACT

A storage device system includes an information processing device, a first storage device equipped with a first storage volume, and a second storage device equipped with a second storage volume. The information processing device and the first storage device are communicatively connected to one another. Also, the first storage device and the second storage device are communicatively connected to one another. The information processing device is equipped with a first write request section that requests to write data in the first storage device according to a first communications protocol, and a second write request section that requests to write data in the second storage device according to a second communications protocol. The information processing device creates first data including a first instruction to be executed in the second storage device.

21 Claims, 14 Drawing Sheets

U.S. PATENT DOCUMENTS

| | | | |
|---|---|---|---|
| 5,758,118 | A | 5/1998 | Choy et al. |
| 5,802,327 | A | 9/1998 | Hawley et al. |
| 5,835,954 | A | 11/1998 | Duyanovich et al. |
| 5,870,537 | A | 2/1999 | Kern et al. |
| 5,895,485 | A | 4/1999 | Loechel et al. |
| 5,917,723 | A | 6/1999 | Binford |
| 5,956,750 | A | 9/1999 | Yamamoto et al. |
| 5,978,890 | A | 11/1999 | Ozawa et al. |
| 6,012,123 | A | 1/2000 | Pecone et al. |
| 6,098,129 | A | 8/2000 | Fukuzawa et al. |
| 6,108,748 | A | 8/2000 | Ofek et al. |
| 6,148,383 | A | 11/2000 | Micka |
| 6,173,374 | B1 | 1/2001 | Heil et al. |
| 6,195,730 | B1 | 2/2001 | West |
| 6,219,753 | B1 | 4/2001 | Richardson |
| 6,230,239 | B1 | 5/2001 | Sakaki et al. |
| 6,240,486 | B1 | 5/2001 | Ofek et al. |
| 6,240,494 | B1 | 5/2001 | Nagasawa et al. |
| 6,247,099 | B1 | 6/2001 | Skazinski et al. |
| 6,247,103 | B1 | 6/2001 | Kern et al. |
| 6,253,295 | B1 | 6/2001 | Beal |
| 6,351,792 | B1 | 2/2002 | Milillo |
| 6,356,977 | B2 | 3/2002 | Ofek et al. |
| 6,374,327 | B2 | 4/2002 | Sakaki et al. |
| 6,393,537 | B1 | 5/2002 | Kern et al. |
| 6,421,767 | B1 | 7/2002 | Milillo |
| 6,446,141 | B1 | 9/2002 | Nolan et al. |
| 6,446,175 | B1 | 9/2002 | West et al. |
| 6,446,176 | B1 | 9/2002 | West et al. |
| 6,457,109 | B1 | 9/2002 | Milillo |
| 6,457,139 | B1 | 9/2002 | D'Errico et al. |
| 6,484,173 | B1 | 11/2002 | O'Hare et al. |
| 6,490,659 | B1 | 12/2002 | McKean et al. |
| 6,523,096 | B2 | 2/2003 | Sanada et al. |
| 6,529,944 | B1 | 3/2003 | Lecrone |
| 6,529,976 | B1 | 3/2003 | Fukuzawa et al. |
| 6,553,408 | B1 | 4/2003 | Merrell et al. |
| 6,587,933 | B2 | 7/2003 | Crockett |
| 6,598,134 | B2 | 7/2003 | Ofek et al. |
| 6,611,901 | B1 | 8/2003 | Micka et al. |
| 6,640,278 | B1 | 10/2003 | Nolan et al. |
| 6,640,291 | B2 | 10/2003 | Fujibayashi |
| 6,643,671 | B2 | 11/2003 | Milillo |
| 6,643,750 | B2 | 11/2003 | Achiwa et al. |
| 6,647,476 | B2 | 11/2003 | Nagasawa et al. |
| 6,654,830 | B1 | 11/2003 | Taylor et al. |
| 6,681,303 | B1 | 1/2004 | Watabe et al. |
| 6,684,310 | B2 | 1/2004 | Anzai et al. |
| 6,708,232 | B2 | 3/2004 | Obara |
| 6,745,281 | B1 | 6/2004 | Saegusa |
| 6,799,255 | B1 | 9/2004 | Blumenau |
| 6,816,948 | B2 | 11/2004 | Kitamura et al. |
| 6,826,778 | B2 | 11/2004 | Bopardikar et al. |
| 6,851,020 | B2 | 2/2005 | Matsumoto et al. |
| 6,883,064 | B2 | 4/2005 | Yoshida et al. |
| 6,912,629 | B1 | 6/2005 | West et al. |
| 6,922,762 | B2 | 7/2005 | Hirakawa et al. |
| 7,082,506 | B2 | 7/2006 | Nakano et al. |
| 7,219,201 | B2 | 5/2007 | Kasako et al. |
| 2001/0050915 | A1* | 12/2001 | O'Hare et al. ............... 370/400 |
| 2001/0052018 | A1 | 12/2001 | Yokokura |
| 2002/0004857 | A1 | 1/2002 | Arakawa et al. |
| 2002/0019920 | A1 | 2/2002 | Reuter et al. |
| 2002/0019922 | A1 | 2/2002 | Reuter et al. |
| 2002/0019923 | A1 | 2/2002 | Reuter et al. |
| 2002/0026558 | A1 | 2/2002 | Reuter et al. |
| 2002/0029326 | A1 | 3/2002 | Reuter et al. |
| 2002/0065864 | A1 | 5/2002 | Hartsell et al. |
| 2002/0087544 | A1 | 7/2002 | Selkirk et al. |
| 2002/0103889 | A1 | 8/2002 | Markson et al. |
| 2002/0112113 | A1 | 8/2002 | Karpoff |
| 2002/0133735 | A1 | 9/2002 | McKean et al. |
| 2002/0156887 | A1 | 10/2002 | Hashimoto |
| 2002/0156984 | A1 | 10/2002 | Padovano |
| 2002/0156987 | A1 | 10/2002 | Gajjar et al. |
| 2002/0178335 | A1 | 11/2002 | Selkirk et al. |
| 2002/0188592 | A1 | 12/2002 | Leonhardt et al. |
| 2002/1094523 | | 12/2002 | Ulrich et al. |
| 2003/0002503 | A1 | 1/2003 | Brewer |
| 2003/0037071 | A1 | 2/2003 | Harris et al. |
| 2003/0051109 | A1 | 3/2003 | Cochran |
| 2003/0056038 | A1 | 3/2003 | Cochran |
| 2003/0079014 | A1 | 4/2003 | Lubbers et al. |
| 2003/0093597 | A1 | 5/2003 | Marshak et al. |
| 2003/0097607 | A1 | 5/2003 | Bessire |
| 2003/0126107 | A1 | 7/2003 | Yamagami |
| 2003/0126327 | A1 | 7/2003 | Pesola et al. |
| 2003/0145169 | A1 | 7/2003 | Nagasawa |
| 2003/0182525 | A1 | 9/2003 | O'Connell |
| 2003/0204597 | A1 | 10/2003 | Arakawa et al. |
| 2003/0212854 | A1 | 11/2003 | Kitamura et al. |
| 2004/0003022 | A1 | 1/2004 | Garrison et al. |
| 2004/0049553 | A1 | 3/2004 | Iwamura et al. |
| 2004/0054850 | A1 | 3/2004 | Fisk et al. |
| 2004/0064610 | A1 | 4/2004 | Fukuzawa et al. |
| 2004/0064641 | A1 | 4/2004 | Kodama |
| 2004/0073831 | A1 | 4/2004 | Yanai et al. |
| 2004/0088417 | A1 | 5/2004 | Bober et al. |
| 2004/0117369 | A1 | 6/2004 | Mandal |
| 2004/0123180 | A1 | 6/2004 | Soejima et al. |
| 2004/0143832 | A1 | 7/2004 | Yamamoto et al. |
| 2004/0148443 | A1 | 7/2004 | Achiwa |
| 2004/0172510 | A1 | 9/2004 | Nagashima et al. |
| 2004/0186968 | A1 | 9/2004 | Factor |
| 2004/0230980 | A1 | 11/2004 | Koyama et al. |
| 2004/0260735 | A1 | 12/2004 | Martinez |
| 2004/0260875 | A1 | 12/2004 | Murotani et al. |
| 2004/0260966 | A1 | 12/2004 | Kaiya et al. |
| 2005/0010743 | A1 | 1/2005 | Tremblay et al. |
| 2005/0081009 | A1 | 4/2005 | Williams et al. |
| 2005/0240741 | A1 | 10/2005 | Nagasawa et al. |
| 2008/0091899 | A1 | 4/2008 | Innan et al. |

FOREIGN PATENT DOCUMENTS

| | | | |
|---|---|---|---|
| EP | 0869438 | A2 | 10/1998 |
| EP | 1130514 | | 9/2001 |
| EP | 1313017 | A1 | 5/2003 |
| JP | 06-214853 | | 8/1994 |
| JP | 09/288547 | | 4/1997 |
| JP | 10-283272 | | 10/1998 |
| JP | 11-184641 | | 7/1999 |
| JP | 2000/293317 | | 10/2000 |
| JP | 2001/067187 | | 3/2001 |
| JP | 2002/157091 | | 5/2002 |
| JP | 2002/230246 | | 8/2002 |
| JP | 2002-259183 | | 9/2002 |
| JP | 2003-122509 | | 4/2003 |
| JP | 2003-131917 | | 5/2003 |
| WO | 97-09676 | | 3/1997 |
| WO | 97/45790 | | 12/1997 |
| WO | 01/53945 | | 7/2001 |
| WO | 01/97030 | | 12/2001 |
| WO | 02/25446 | | 3/2002 |

OTHER PUBLICATIONS

"Network Attached Storage", Product White Paper, Feb. 2002, Sony Electronics Inc., (2002).

Milligan et al, "Online Storage Virtualization: The Key to Managing the Data Explosion", Proceedings of the 35th Annual Hawaii Intl. Conference on Systems Sciences, 2002, 9 pages.

Anderson et al, "Hippodrome: Running Circles Around Storage Adminisration", Proceedings of Conference on File and Storage Technologies (FAST '02), Jan. 2002, pp. 175-188.

"EMC TimeFinder Product Description Guide", Aug. 19, 2000, pp. 1-34.

Storage Subsystem Library, "IBM 3990 Storage Control Reference", Sep. 1991, 5$^{th}$ Ed., 2 pages.

SICOLA "SCSI-3 Fault Tolerant Controller Configurations", T10 Technical Committee of the International Committee on Information Technology Standards, Feb. 28, 1996, available at http://ww.t10.org(1996).

* cited by examiner

| DEVICE | COMMAND DEVICE LUN |
|---|---|
| FIRST | 0 |
| SECOND | 1 |

~ 501

601

| COPY SOURCE DEVICE | COPY DESTINATION DEVICE | PRIMARY LUN | PRIMARY JOURNAL | AUXILIARY LUN | AUXILIARY JOURNAL LUN |
|---|---|---|---|---|---|
| FIRST | SECOND | 0 | 3 | 0 | 3 |
| FIRST | SECOND | 1 | 4 | 1 | 4 |
| FIRST | SECOND | 2 | 5 | 2 | 5 |
| ⋮ | ⋮ | ⋮ | ⋮ | ⋮ | ⋮ |

~1001

REMOTE STORAGE DISK CONTROL DEVICE AND METHOD FOR CONTROLLING THE SAME

CROSS REFERENCES

This is a continuation application of Ser. No. 12/071,325, filed Feb. 20, 2008 (now U.S. Pat. No. 7,707,377), which is a continuation application of Ser. No. 11/492,892, filed Jul. 26, 2006 (now U.S. Pat. No. 7,363,461, which is continuation of application Ser. No. 11/087,983, filed Mar. 22, 2005 (now U.S. Pat. No. 7,165,163), which is a continuation of Ser. No. 10/748,886, filed Dec. 30, 2003 (now U.S. Pat. No. 7,219, 201).

This application claims priority to JP 2003-325082 filed Sep. 17, 2003.

BACKGROUND OF THE INVENTION

1. Field of the Invention

The present invention relates to a method for controlling a storage device system, a storage device system, and a storage device.

2. Related Background Art

Disaster recovery in information processing systems is attracting attention. As a technology to realize such disaster recovery, a technology in which a copy of data stored in a storage device that is installed in a primary site is also managed by a storage device that is installed in a remote site located away from the primary site is known. By using the data stored in the storage device installed at the remote site when the primary site is hit by a disaster, processings that are performed at the primary site can be continued at the remote site.

For data transfer from the primary site to the remote site, a method in which data is exchanged between an information processing device at the primary site and an information processing device at the remote site is known. The information processing device at the primary site transfers a copy of data that is written in the storage device at the primary site to the information processing device at the remote site. The information processing device at the remote site that has received the copy of data sends a request to write the data in the storage device at the remote site.

When data is stored as a backup by the method described above, a substantially large amount of data flow occurs on the network between the information processing devices. This causes a variety of problems such as an increased interface processing load on the information processing devices, delays in other data transmissions to be conducted between the information processing devices, and the like. Also, the method described above needs software to control data backup to be installed in each of the information processing devices. For this reason, management works such as upgrading the software and the like need to be performed on all of the information processing devices that execute data backup processings, which increases the management cost.

SUMMARY OF THE INVENTION

The present invention has been made in view of the problems described above, and relates to a storage device system, a storage device and a method for controlling a storage device system.

In accordance with an embodiment of the present invention, there is provided a method for controlling a storage device system that includes at least one information processing device, a first storage device equipped with a first storage volume, and a second storage device equipped with a second storage volume, wherein the information processing device and the first storage device are communicatively connected to one another, the first storage device and the second storage device are communicatively connected to one another, the information processing device is equipped with a first write request section that requests to write data in the first storage device according to a first communications protocol, and the first storage device is equipped with a second write request section that requests to write data in the second storage device according to a second communications protocol. The method comprises: a step in which the information processing device sets a first instruction to be executed at the second storage device as first data; a step in which the information processing device sends a request to write the first data in the first storage volume to the first write request section; a step in which, when the first data written in the first storage volume is an instruction to the second storage device, the first storage device sends a request to write the first data in the second storage volume to the second write request section; and a step in which the second storage device executes the first instruction that is set as the first data written in the second storage volume.

It is noted that the information processing device may be, for example, a personal computer, a work station or a mainframe computer. The storage device may be, for example, a disk array device or a semiconductor storage device. The storage volume may be a storage resource that includes a physical volume that is a physical storage region provided by a disk drive, and a logical volume that is a storage region logically set on the physical volume. Also, the communications protocol may be, for example, a WRITE command stipulated by a SCSI (Small Computer System Interface) standard. As a result, without adding new commands to the operating system, the information processing device can make the second storage device to execute the first command.

Here, for example, when the first command is a command to read data of the first storage device, the second storage device can have a copy of the data of the first storage device according to an instruction from the information processing device. Therefore the present method can reduce the amount of data communicated between the information processing devices in the data backup management. Also, software for controlling data backup does not have to be installed on all of the information processing devices that are performing data backup, which lowers the management costs.

Other features and advantages of the invention will be apparent from the following detailed description, taken in conjunction with the accompanying drawings that illustrate, by way of example, various features of embodiments of the invention.

PREFERRED EMBODIMENTS OF THE INVENTION

[Example of Overall Structure]

Figure 1:
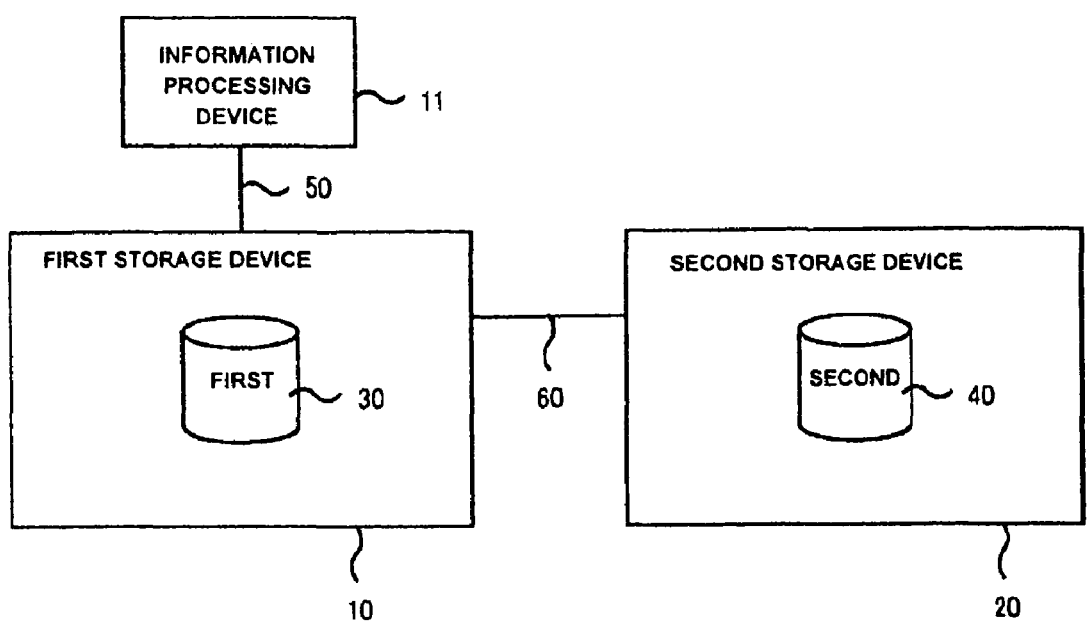
FIG. 1 schematically shows a system configuration of an information processing system in accordance with an embodiment of the present invention.

FIG. 1 schematically shows an overall structure of an information processing system including a storage device system in accordance with an embodiment of the present invention. The information processing system of the present embodiment includes an information processing device 11, and at least a first storage device 10 and a second storage device 20. The first storage device 10 is equipped with a logical volume (s) 30 on which the first storage device performs data input/output processings (hereafter referred to as a "first logical volume(s)"), and the second storage device 20 is equipped with a logical volume(s) 40 on which the second storage device performs data input/output processings (hereafter referred to as a "second logical volume(s)").

The information processing device 11 and the first storage device 10 are communicatively connected to each other via a first network 50. The first network 50 may be, for example, a LAN (Local Area Network), a SAN (Storage Area Network), an iSCSI (Internet Small Computer System Interface), an ESCON (Enterprise Systems Connection)®, or a FICON (Fibre Connection)®.

The first storage device 10 and the second storage device 20 are communicatively connected to each other via a second network 60. The second network 60 may be, for example, a Gigabit Ether Net®, an ATM (Asynchronous Transfer Mode), or a public telephone line.

[Information Processing Device]

The information processing device 11 may be a computer that is equipped with a CPU (Central Processing Unit), memories, and other devices. The information processing device 11 may be a personal computer, a work station or a mainframe computer. The information processing device 11 may be composed of a plurality of computers that are mutually connected. An operating system is operating on the information processing device 11, and application software is operating on the operating system.

[Storage Device]

Figure 2:
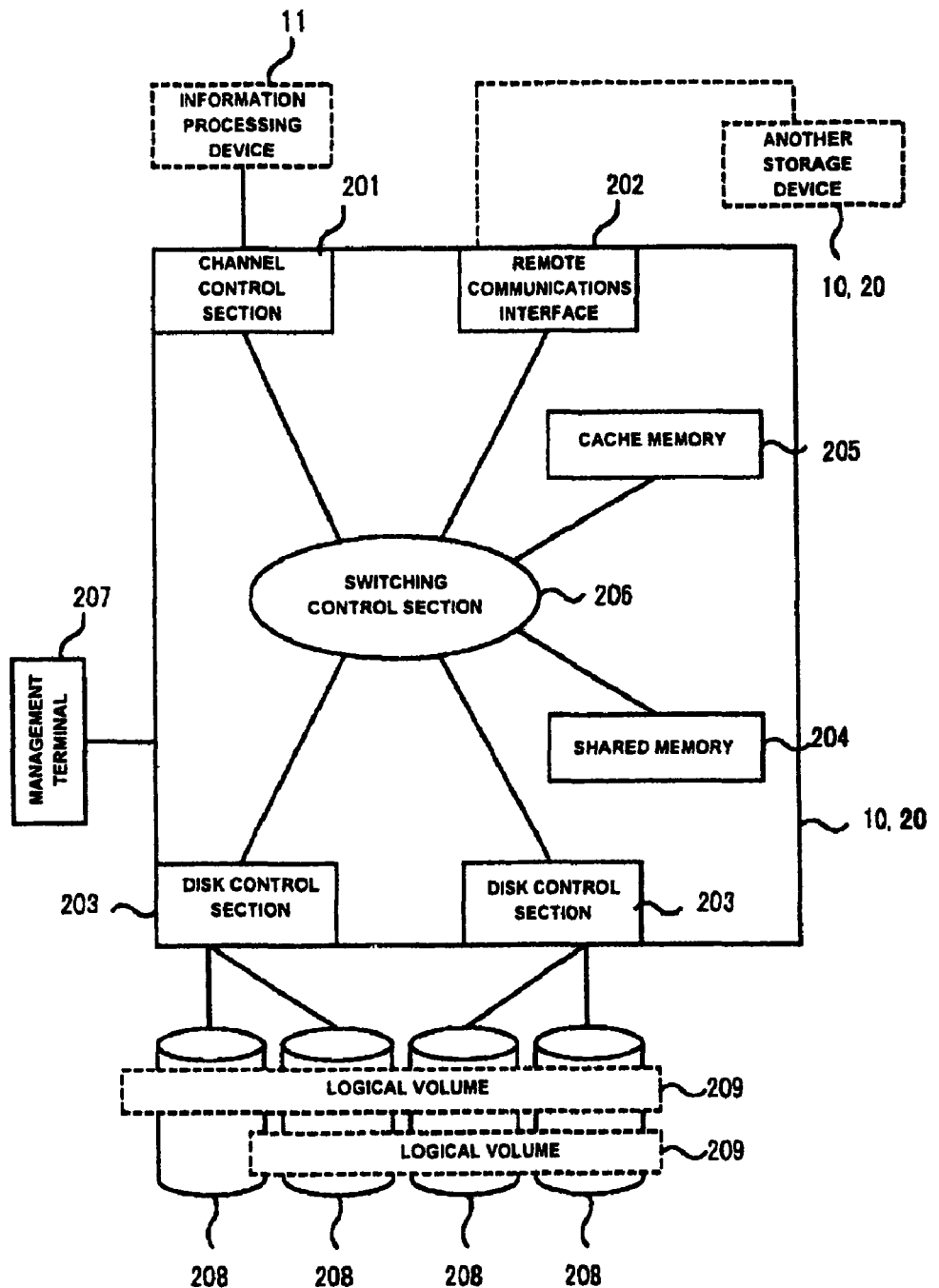
FIG. 2 schematically shows a structure of a disk array device in accordance with an embodiment of the present invention.

FIG. 2 shows a structure of a disk array device, which is described as an example of the first storage device 10 and the second storage system 20. Instead to of the disk array device, the first and second storage devices 10 and 20 may be any appropriate devices, such as, for example, semiconductor storage devices. For example, the disk array device 10 is equipped with various components including a channel control section 201, a remote communications interface 202, disk control sections 203, a shared memory 204, a cache memory 205, a switching control section 206 that is composed of cross bus switches that communicatively connect the components described above, a management terminal 207, and memory devices 208. The first and second storage devices 10 and 20 may have the same structure.

The cache memory 205 is used to temporarily store data that is exchanged mainly between the channel control section 201 and the disk control sections 203. For example, when a data input/output command which the channel control section 201 receives from the information processing device 11 is a write command, the channel control section 201 writes in the cache memory 205 write data received from the information processing device 11. Also, an appropriate one of the disk control devices 203 reads the data written in the cache memory 205, and writes the same in the memory devices 208.

The disk control section 203 reads a data I/O request stored in the shared memory 204 written by the channel control section 201, and executes data writing processing or data reading processing with respect to the memory devices 208 according to a command set at the data I/O request (for example, a command according to a SCSI standard). The disk to control section 203 writes in the cache memory 205 data that has been read out from the memory devices 208. Also, the disk control section 203 transmits to the channel control section 201 notifications, such as, for example, a data write completion notification and a data read completion notification. The disk control section 203 may be equipped with a function to control the memory devices 208 with RAID levels (for example, 0, 1, 5) stipulated in the so-called RAID (Redundant Array of Inexpensive Disks) method.

The memory devices 208 may be, for example, hard disk devices. The memory devices 208 may be provided in one piece with or separately as independent devices from the disk array device. Storage regions provided by the memory devices 208 at each site are managed in units of logical volumes 209, which are volumes that are logically set on the storage regions. Data can be written in or read from the memory devices 208 by designating LUNs (Logical Unit Numbers) that are identifiers appended to the corresponding logical volumes 209. Also, the logical volumes 209 are managed in units of a predetermined data amount such as units of 512 Kb, such that input and output of data in this predetermined unit are conducted. Each of the units is called a logical block, and each of the logical blocks is appended with a logical block address (hereafter referred to as a "LBA") that indicates positional information of the logical block.

The management terminal 207 may be a computer for maintaining and managing the disk array device and the memory devices 208. Changes in the software and parameters to be executed by the channel control section 201 and the disk control section 203 can be conducted by giving instructions from the management terminal 207. The management terminal 207 can be in a form that is built in the disk array device, or can be provided independently from the disk array device.

The remote communications interface 202 is a communications interface (i.e., a channel extender) that is used for data transfer to another storage device. A copy of data is transferred in a remote copy operation to be descried below through this remote communications interface 202. The remote communications interface 202 converts the interface of the channel control section 201 (for example, an interface such as an ESCON interface or a FICON® interface) to a communications method of the second network 60, whereby data transfer with the other storage device can be realized.

Besides the structure described above, the disk array device may have a structure that functions as a NAS (Network Attached Storage) configured to accept data input/output requests through designating file names from the information processing device 11 according to a relevant protocol such as a NFS (Network File System).

The shared memory 204 can be accessed from both of the channel control section 201 and the disk control section 203. The shared memory 204 is used for delivering data input/output request commands, as well as for storing management information for the storage devices 10 and 20, and the memory devices 208. In the present embodiment, the shared memory to 204 stores a LUN map information table 301 shown in FIG. 3, a command device management table 501 shown in FIG. 5, and a pair management table 1001 shown in FIG. 10.

[Virtual Volume]

As described above, the logical volumes 209 are storage regions that are logically set on the physical volumes. Also, by using "virtual volumes" as logical volumes, the storage devices 10 and 20 on which the logical volumes 209 are set can be differentiated from other storage devices that are equipped with physical volumes correlated with the logical volumes 209.

Figures 3, 4:
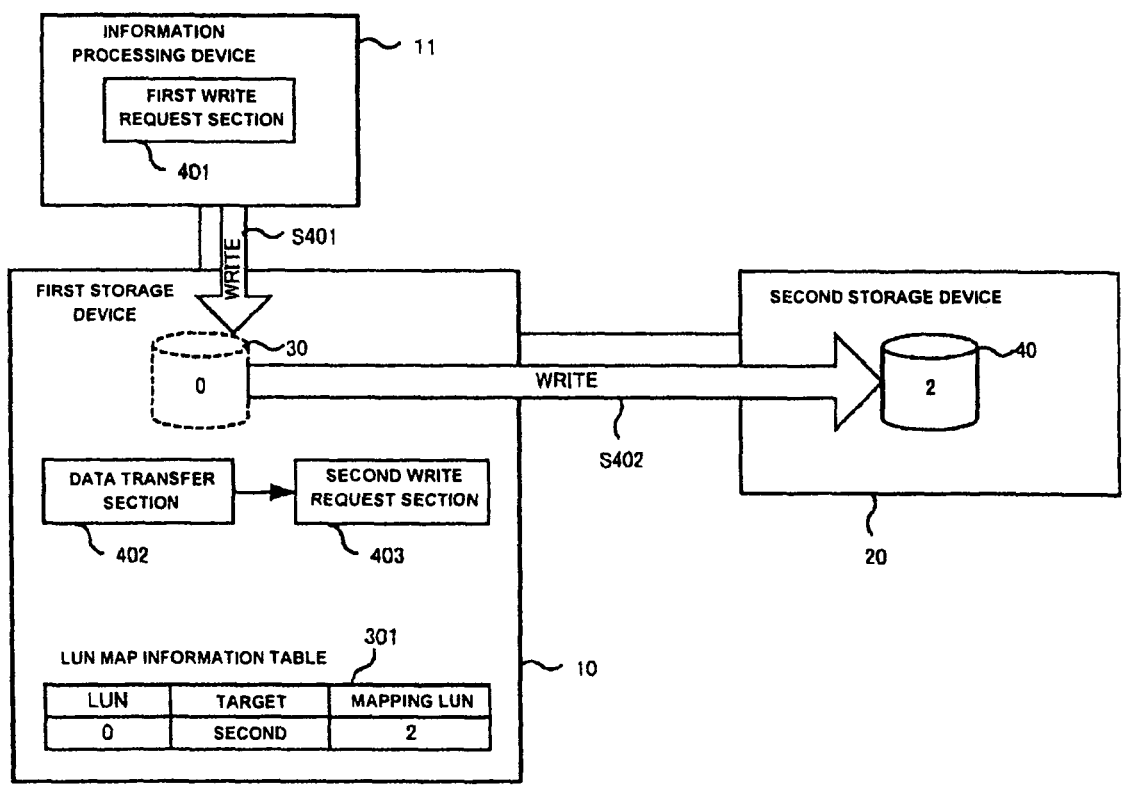
FIG. 3 shows a LUN map information table in accordance with an embodiment of the present invention.
FIG. 4 schematically shows a diagram illustrating a data writing operation using virtual volumes in accordance with an embodiment of the present invention.

To realize this function, the first storage device 10 stores a LUN map information table 301 shown in FIG. 3. The LUN map information table 301 describes information relating to the logical volumes 209 that are handled by the first storage device 10. For example, in the present embodiment, the LUN map information table 301 includes entries of "LUN," "Target" and "Mapping LUN."

Each entry at "LUN" describes a LUN for each of the logical volumes. When a logical volume 209 is a virtual volume, a storage device that is equipped with the logical volume 209 correlated with the virtual volume is set at "Target." Furthermore, a LUN of the logical volume 209 correlated with the virtual volume is set at "Mapping LUN." In other words, when there is a description at "Mapping LUN," it means that the corresponding logical volume is a virtual volume.

Details of the LUN map information table 301 may be registered, for example, by an operator through the management terminal 207 that is connected to the first storage device 10.

The first storage device 10 uses the LUN map information table 301 described above and provides the second logical volume 40 of the second storage device 20 to the information processing device 11 by a mechanism to be described below as if the second logical volume 40 were the first logical volume 30 of the storage device 10. In other words, the information processing device 11 can make data input/output requests, which are to be issued to the logical volume 209 of the second storage device 20, to the first storage device 10.

Processings by the storage device system, which take place when a data input/output request transmitted from the information processing device 11 is a data write request, will be described with reference to FIG. 4.

The information processing device 11 is equipped with a first write request section 401 that writes data in the first storage device 10 according to a first communications protocol. Upon receiving a data write request from the first write request section 401 (S401), the first storage device 10 writes in the cache memory 205 data to be written that has been received with the data write request.

A data transfer section 402 of the first storage device 10 refers to the LUN map information table 301, and confirms as to whether or not a mapping LUN is set for a first logical volume 30 that is set in the data write request. If a second logical volume 40 is set as the mapping LUN, to the data transfer section 402 transfers to a second write request section 403 a request to write the data in the second logical volume 40 according to a second communications protocol. In this embodiment, the second write request section 403 makes data write requests to the second storage device 20 according to the second communications protocol. The second storage device 20 receives the data write request from the second write request section 403, and writes the data in the second logical volume 40 (S402).

It is noted that the first communications protocol and the second communications protocol are for example WRITE commands stipulated by a SCSI standard. Accordingly, the data write interfaces at the first storage device 10 and the second storage device 20 do not need to be changed.

The write processing has been so far described. It is noted however that a read processing to read data from a logical volume is also performed in a manner similar to the write processing except that data is transferred in an opposite direction with respect to the data transfer direction in the write processing.

As describe above, in the storage device system in accordance with the present embodiment, the information processing device 11 accesses the second logical volume as if the second logical volume were a logical volume on the first storage device 10.

[Command Device]

Each of the storage devices 10 and 20 is equipped with a "command device" for controlling special commands. The command device is used to convey commands from the information processing device 11 to the storage devices 10 and 20, and the storage devices 10 and 20 can execute commands that are stored in the command devices. What makes the special commands different from ordinary commands is that the command devices are the logical volumes 209. Functions of the command device will be described below.

Figures 5, 6:
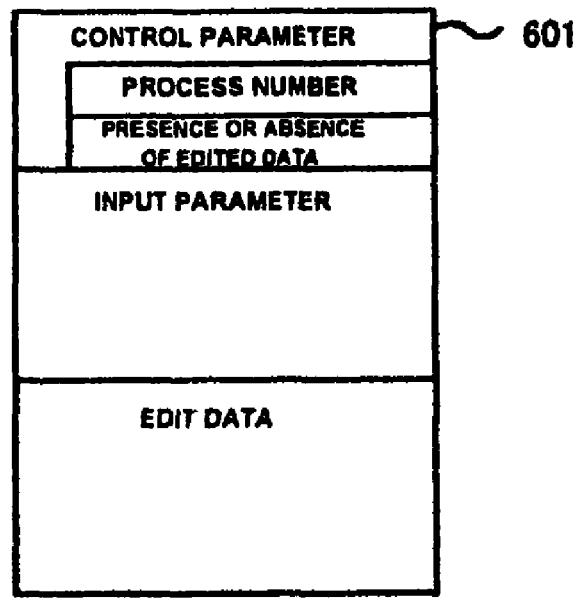
FIG. 5 shows a command device management table in accordance with an embodiment of the present invention.
FIG. 6 shows a command device interface in accordance with an embodiment of the present invention.

FIG. 5 shows a command device management table 501 that is stored in each of the storage devices 10 and 20. The command device management table 501 contains entries such as "Device" and "Command Device LUN." Entries at "Device" indicate as to which of the storage devices 10 and 20 correspond to which of the command devices. Each entry at "Command Device LUN" sets a LUN of each logical volume 209 which expresses the entity of the corresponding command device.

Details of the command device management table 501 may be registered, for example, by an operator through the management terminal 207 that is connected to each of the storage devices 10 and 20.

The command device management table 501 of each of the storage devices 10 and 20 can register command devices of other storage devices (that may be similar to the storage device 10 or 20). When the command devices of the other storage devices are registered, LUNs of virtual volumes, which correspond to the LUNs of the command devices of the other storage devices are registered at the entries "Command Device to LUN."

FIG. 6 shows an example of a command device interface 601, which is a data format of data that is written in a command device. The command device interface 601 is composed of a control parameter, an input parameter, and edited data. The control parameter is composed of a "process number" that indicates a command to be executed by a relevant storage device, and a "presence or absence of edited data" that indicates whether or not data is outputted as a result of the execution of the command. The input parameter sets parameter information that is used when executing the command. Also, the edited data sets data that is outputted as a result of executing the command.

Figure 7:
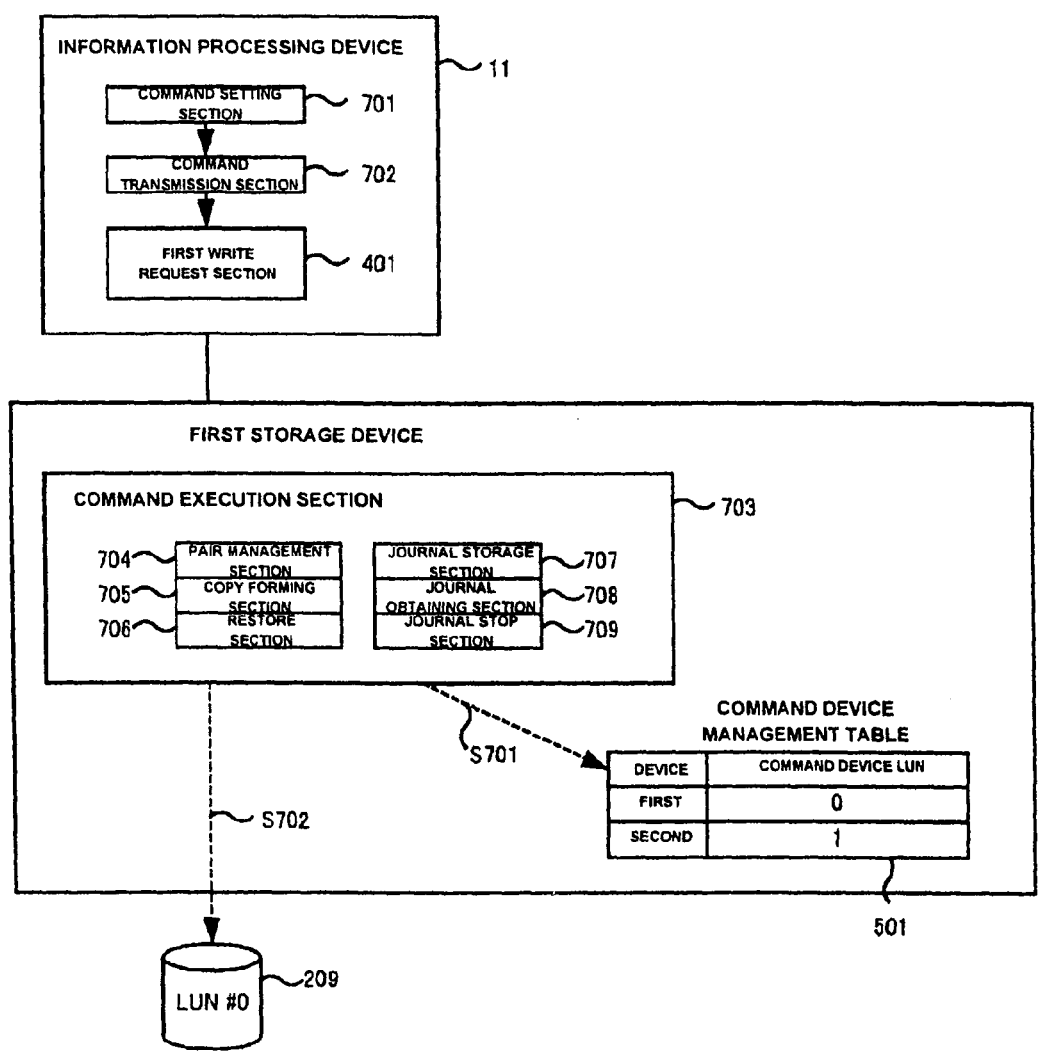
FIG. 7 is a schematic diagram illustrating execution of commands set at command devices in accordance with an embodiment of the present invention.

An outline of a process flow to execute a command using a command device will be described with reference to FIG. 7. The information processing device 11 is equipped with a command setting section 701 and a command transmission section 702. The command setting section 701 generates data that sets in a command interface 601 a "process number" of a command to be executed by the first storage device 10 and its "presence or absence of edited data." The command transmission section 702 transmits to the first write request section 401 a request to write the data in a first logical volume, which is a command device of the first storage device 10, according to a first communications protocol.

The first storage device 10 is equipped with a command execution section 703. The command execution section 703 is equipped with a pair management section 704, a copy forming section 705, a restore section 706, a journal storing section 707, a journal acquisition section 708 and a journal stop section 709, which control pairs of the logical volumes 209 to be described below.

The command execution section 703 refers to a command device management table 501, and obtains a LUN of a command device that corresponds to the first storage device 10 (S701). The command execution section 703 refers to the command device (S702) and, if data in the form of the command device interface 601 exists, executes a command designated by a process number indicated in the data.

Figure 8:
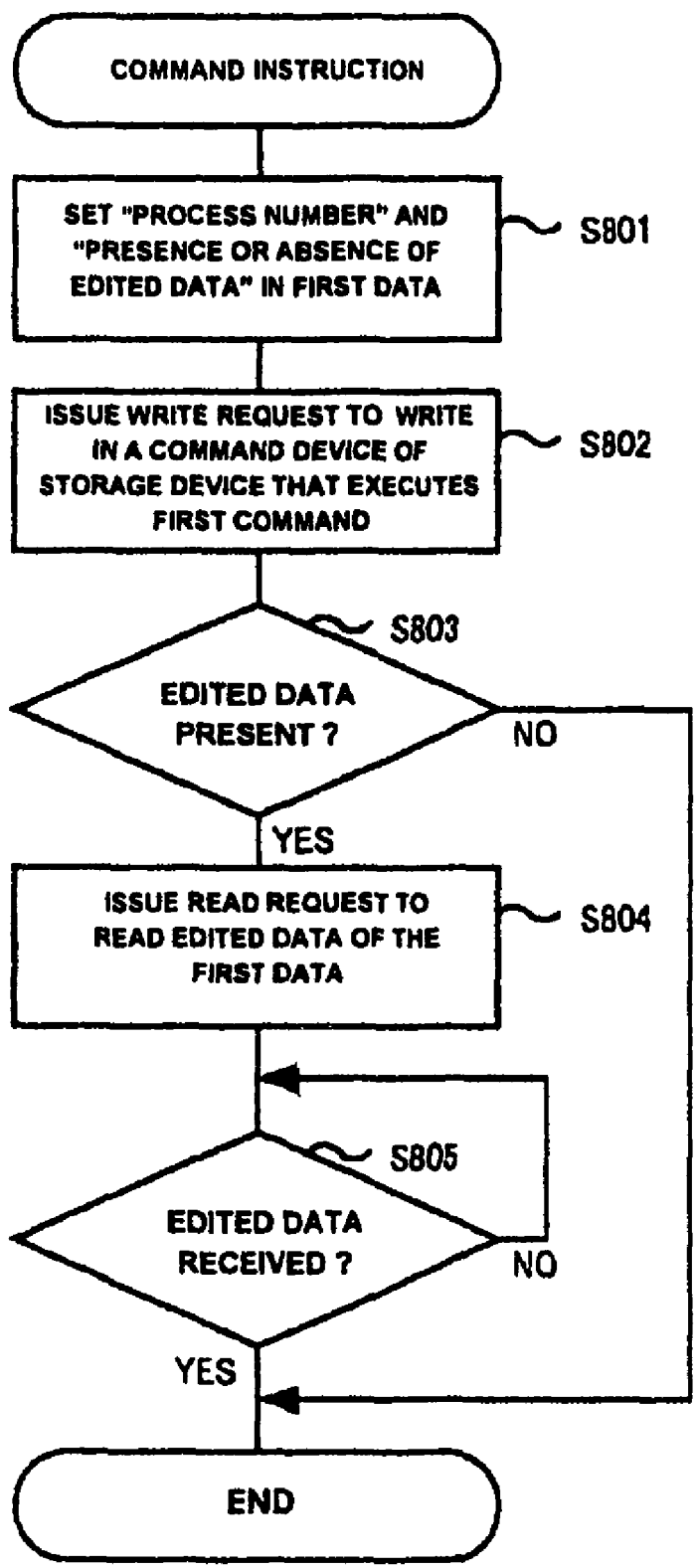
FIG. 8 shows a flowchart of an operation to control a command device in an information processing device in accordance with an embodiment of the present invention.
Figure 9:
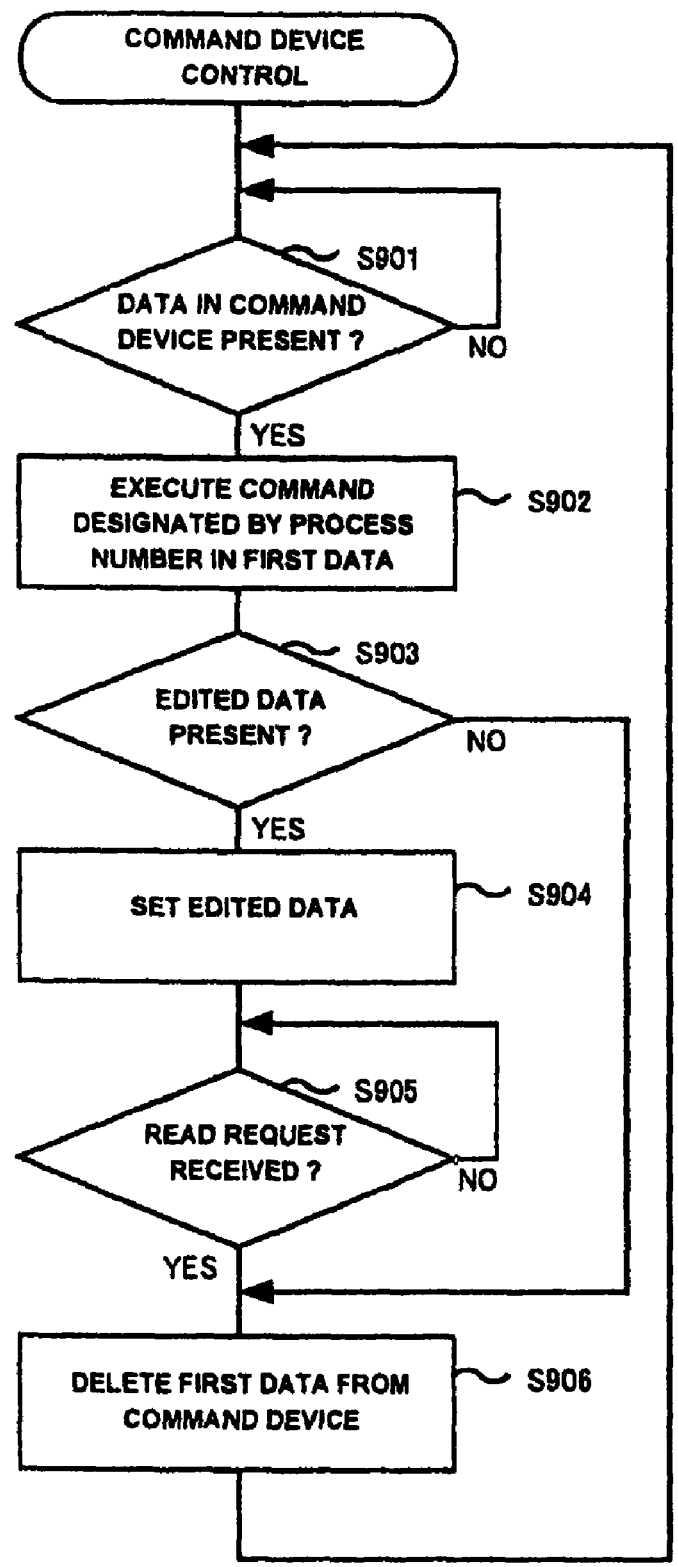
FIG. 9 shows a flowchart of an operation to control a command device in a storage device in accordance with an embodiment of the present invention.

Referring to flow charts in FIGS. 8 and 9, processes executed by the information processing device 11 and the storage devices 10 and 20 will be described. First, the information processing device 11 sets a "process number" and a "presence or absence of edited data" in first data in the form of the command device interface 601 (S801). Then, the information processing device 11 refers to a command device management table 501 stored in the storage device 10, and obtains a LUN of a relevant command device of a storage device which executes the command. In order to write the created first data at the LUN obtained, the information processing device 11 transmits to the storage device 10 a write request designating the LUN (S802).

Upon receiving the write request, the storage device 10 writes the first data in the command device at the designated LUN.

It is noted that command devices are logical devices that are defined on storage areas of a plurality of storage devices, like the logical volumes 209, and write requests to the command devices are transmitted based on the same communications protocol as that for write requests transmitted to the logical volumes 209.

The storage device 10 refers to the command device management table 501, to specify LUNs of command devices that the storage device 10 itself should refers to, and monitors whether or not the command devices have data written therein (S901). When the first data is found written in any of the command devices under observation, the storage device 10 executes the command designated by the process number in the first data (S902). Having completed the execution of the command, the storage device 10 confirms whether edited data of the first data is present or absent (S903). When edited data is absent, the storage device 10 deletes the first data from the command device (S906). When edited data is present, the storage device 10 sets data outputted as a result of execution of the command as edited data (S904).

The information processing device 11 confirms whether edited data for the command is present or absent (S803); and transmits to the storage device 10 a read request to read the edited data of the first data when the edited data is present (S804). Upon receiving the edited data from the storage device 10 (Yes at S805), the information processing device 11 completes the processing. It is noted that the read request is transmitted based on the same communications protocol for read requests for the logical volumes 209 other than the command device.

When the edited data exists, after receiving the read request for the edited data from the information processing device 11 (S905), the storage device 10 deletes the first data from the command device (S906).

In this manner, read or write requests that are used by the information processing device 11 for reading or writing data from and to ordinary logical volumes of the storage device 10, the information processing device 11 can transfer commands to the storage device 10.

Also, by using the virtual volumes, the information processing device 11 can transfer commands to the second storage device 20 through the first storage device 10, such that the second storage device 20 can execute the commands.

It is noted that, when the information processing device 11 requests the storage device 10 and 20 to execute a "pair formation," "journal acquisition," "acquisition of processing state of journal," "restore" or "swap" processing to be described below, the information processing device 11 uses the virtual volumes and command devices.

[Pair Formation]

Next, a description will be made as to a method for storing a copy of data in the logical volume 209 of the first storage device 10 in the logical volume 209 of the second storage device 20.

Figures 10, 11:
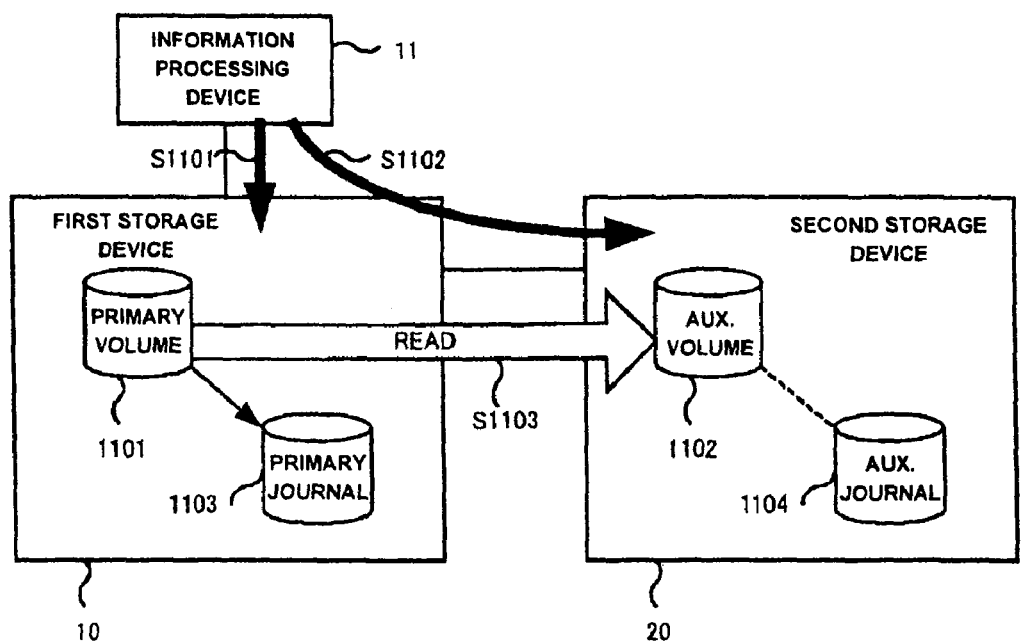
FIG. 10 shows a pair management table in accordance with an embodiment of the present invention.
FIG. 11 shows a schematic diagram illustrating a pair forming processing in accordance with an embodiment of the present invention.

FIG. 10 shows a pair management table 1001. In the pair management table 1001, a column of "COPY SOURCE DEVICE" indicates storage devices (10 or 20) to which those of the logical volumes of copy sources belong (hereafter referred to as "primary volumes"). A column of "COPY DES- TINATION DEVICE" indicates storage devices (10 or 20) to which those of the logical volumes of copy destinations belong (hereafter referred to as "auxiliary volumes"). Also, a column of "PRIMARY LUN" indicates LUNs of the corresponding primary volumes, and a column of "AUXILIARY LUN" indicates LUNs of the corresponding auxiliary volumes. Each correspondence between a primary volume and an auxiliary volume is called a "pair." Those of the logical volumes 209 for storing journals (to be described below) are assigned to the primary volumes and auxiliary volumes. A column of "PRIMARY JOURNAL LUN" sets LUNs of the logical volumes 209 of the journals assigned for the primary volumes (hereafter referred to as "primary journals"). A column of "AUXILIARY JOURNAL LUN" sets LUNs of the logical volumes 209 of the journals assigned for the auxiliary volumes (hereafter referred to as "auxiliary journals").

Any one of appropriate methods for assigning the logical volumes 209 for storing the journals can be used. For example, the user himself/herself may designate those of the logical volumes 209 to be used as the journals, or the information processing device 11 may select appropriate unused ones of the logical volumes 209.

Referring to FIG. 11, an example of a process flow in forming pairs will be described. In this example, it is assumed that the first storage device 10 is equipped with a third logical volume and a fifth logical volume, and the second storage device 20 is equipped with a fourth logical volume and a sixth logical volume. The information processing device 11 transmits a command to the first storage device 10 and the second storage device 20 for forming a pair of the third logical volume as being a primary volume 1101 and the fourth logical volume as being an auxiliary volume 1102, and a pair of the fifth logical volume as being a primary journal 1103 and the sixth logical volume as being an auxiliary journal 1104 (S1101, S1102). The pair management sections 704 of the first and second storage devices 10 and 20 store information indicating the states of the pairs in the pair management tables 1001 of the respective storage devices 10 and 20. The copy forming section 705 of the second storage device 20 transmits to the first storage device 10 a read request to read data in the primary volume; and upon receiving from the first storage device 10 a copy of the data in the primary volume, the second storage device 20 writes the data in the auxiliary volume (S1103). By this operation, the data in the primary volume and the data in the auxiliary volume can be matched with each other. A processing that brings the primary volume in conformity with the auxiliary volume by a pair forming instruction is called an "initial copy" processing.

Figure 12:
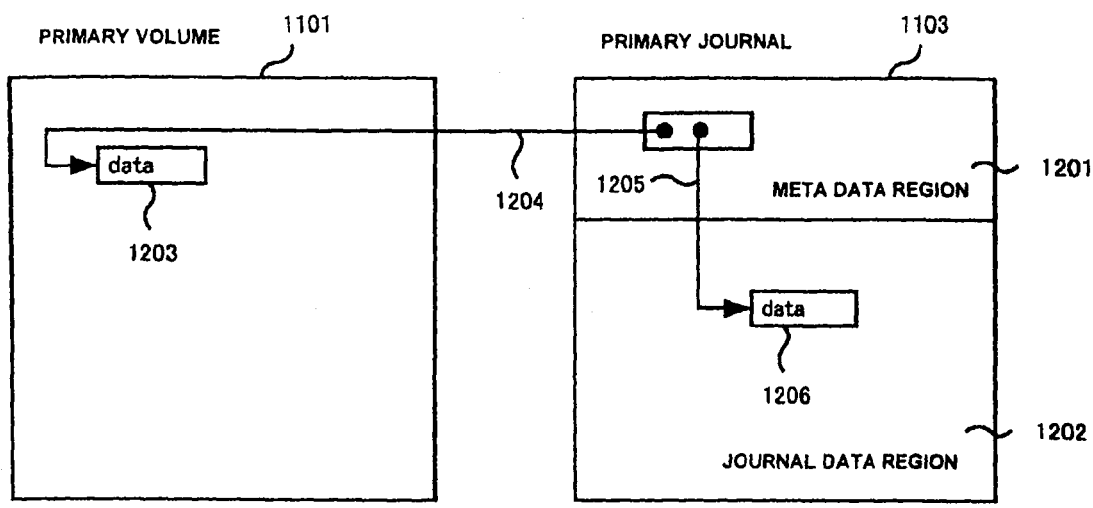
FIG. 12 shows a relation between a primary volume and a primary journal in accordance with an embodiment of the present invention.

Also, the journal storage section 707 of the first storage device 10 starts a processing to obtain a copy of the data written in the primary volume and its positional information in the primary journal. The correlation between the primary volume and the primary journal is described hereunder with reference to FIG. 12. The primary journal is composed of a meta data region 1201 and a journal data region 1202. The journal storage section 707 of the first storage device 10 stores a copy of the data written in the primary volume (hereafter referred to as "journal data") in the journal data region 1202. Also, the journal storage section 707 of the first storage device 10 stores in the meta data region 1201 the time when data 1203 is updated in the primary volume, LBA(s) 1204 of the data 1203, LBA(s) 1206 of the corresponding journal data region, and the data 1203, LBA(s) 1205 of the journal data 1206 in the corresponding journal data region, and the data length of the updated data. Also, the auxiliary journal is composed of a meta data region 1201 and a journal data region 1202 like the primary journal.

logical volume 209 of the second storage device 20 can be stored in the logical volume 209 of the first storage device 10 by an instruction from the information processing device 11.

As a result, without performing data communications between plural information processing devices, and without adding new commands to the operating system of the information processing device 11, data stored in a storage device at a primary site can be stored as a backup in a storage device at a remote site. Also, in accordance with the present embodiment, a storage device at a remote site transmits a read request to a storage device at a primary site to thereby perform a copy forming processing. By this, the processing load on the storage device at the primary site during the copy forming processing is alleviated. In other words, in a method in which a storage device at a primary site writes data in a storage device at a remote site, the storage device at the primary site needs to write the data in the storage device at the remote site after it to confirms that the storage device at the remote site is ready for forming a pair. For this reason, the processing load on the storage device at the primary site becomes heavier, which would affect the overall performance of the primary site that is performing other primary processings. In contrast, in accordance with the present embodiment, since the storage device at the primary site only has to send data in response to a read request from the storage device at the remote site, the processing load at the storage device at the primary site can be alleviated.

[Restoration]

Even after the copy forming processing is performed, the first storage device 10 accepts write requests from the information processing device 11, and updates the data in the primary volumes. For this reason, the data in the primary volumes becomes inconsistent with the data in the auxiliary volumes. As described above, the primary journal stores journal data for executions performed even after the copy forming processing took place. In this respect, the second storage device 20 copies data stored in the primary journal into the auxiliary journal, and writes the data stored in the auxiliary journal into the auxiliary volumes, such that updates of the data on the primary volumes can be likewise performed on the auxiliary volumes.

Here, a processing to copy data stored in the primary journal into the auxiliary journal by the second storage device 20 is referred to as a "journal acquisition" processing, and a processing to write journal data stored in the auxiliary journal into the auxiliary volume is referred to as a "restoration" processing.

Figure 13:
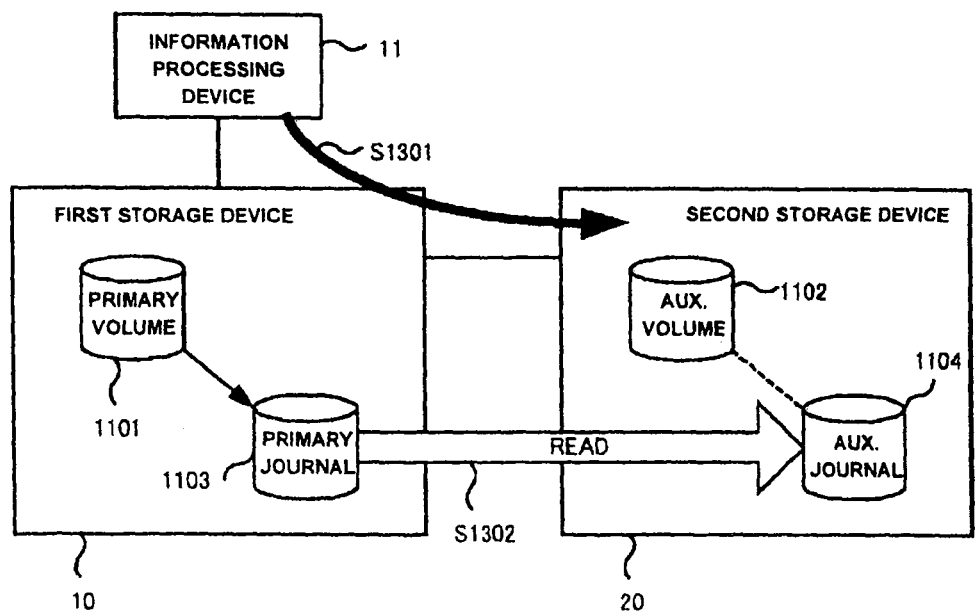
FIG. 13 is a schematic diagram illustrating a journal acquisition processing in accordance with an embodiment of the present invention.

FIG. 13 shows a flowchart of the journal acquisition processing. The information processing device 11 transmits a journal acquisition instruction to the second storage device 20 (S1301). Upon receiving the journal acquisition instruction, the journal acquisition section 708 of the second storage device 20 refers to the pair management table 1001, and obtains a primary journal LUN of the corresponding pair. The journal acquisition section 708 of the second storage device 20 transmits to the first storage device 10 a read request to read the primary journal. Upon receiving a copy of data of the primary journal, the journal acquisition section 708 of the second storage device 20 writes the data in the auxiliary journal (S1302).

Figure 14:
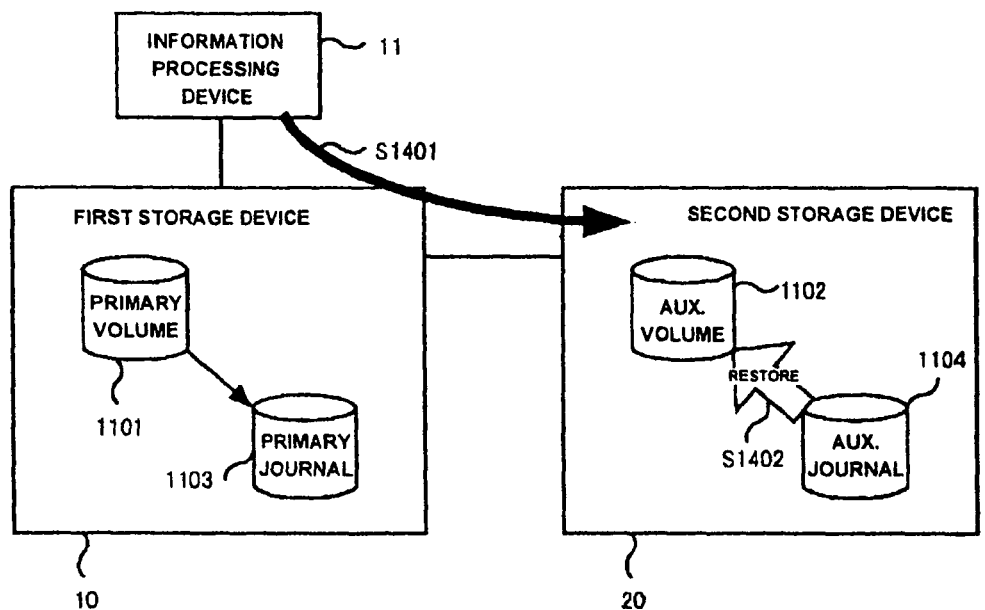
FIG. 14 is a schematic diagram illustrating a restoration processing in accordance with an embodiment of the present invention.

Next, referring to FIG. 14, a processing flow of a restoration processing will be described. The information processing device 11 transmits to the second storage device 20 a restore instruction to restore data in the auxiliary journal onto the auxiliary volumes (S1401). Upon receiving the restore instruction, the restore section 706 of the second storage device 20 writes journal data stored in the auxiliary journal into the auxiliary volumes.

Figure 15:
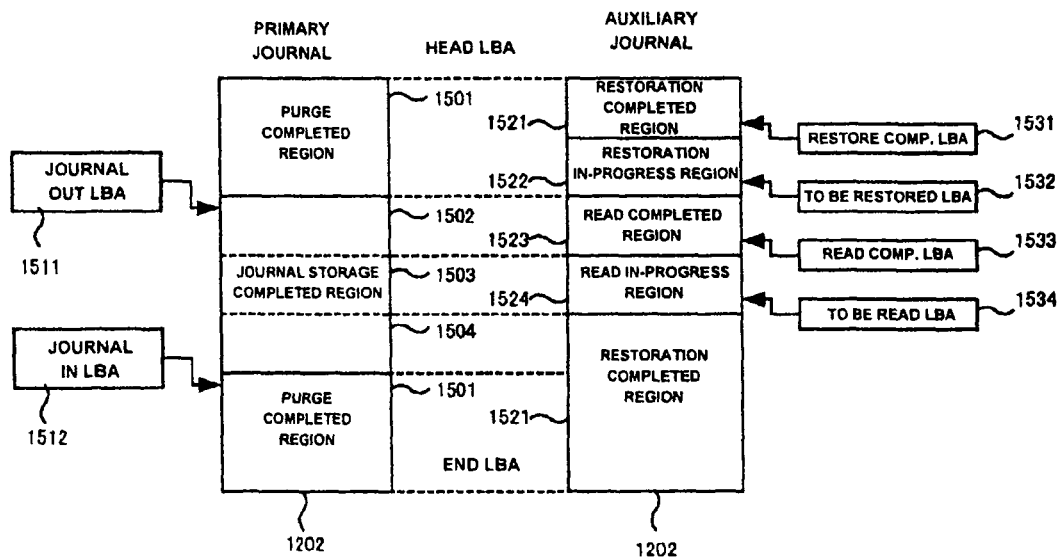
FIG. 15 shows journal data regions of a primary journal and an auxiliary journal in accordance with an embodiment of the present invention.

FIG. 15 shows journal data regions 1202 for the primary journal and the auxiliary journal. The journal data regions for the primary journal and the auxiliary journal are defined by the same head LBA and end LBA, respectively. The journal data region 1202 for the primary journal is composed of journal storage completed regions 1502, 1503 and 1504 which store journal data, and purge completed regions 1501 which do not store journal data.

The journal data region 1202 of the auxiliary journal is composed of restoration completed regions 1521 that store journal data that have already been used for restoration in the auxiliary volumes, restore in-progress region 1522 that stores journal data that are designated for restoration, read completed region 1523 that stores journal data that are not designated for restoration, and read in-progress region 1524 that stores journal data that are being read from the primary journal in response to a journal acquisition instruction.

Each of the storage devices 10 and 20 stores journal data in the journal data region 1202 from the head LBA to the end LBA in a chronological order as the journal data is created. When the journal data reaches the end LBA, each of the storage devices 10 and 20 returns to the head LBA again, and stores journal data from there. In other words, the storage devices 10 and 20 use the journal data regions cyclically between the head LBA and the end LBA.

The first storage device 10 that is equipped with the primary journal stores a journal-out LBA 1511 which is a head LBA of the journal storage completed regions 1502, 1503 and 1504, and a journal-in LBA 1512 which is a head LBA of the purge completed region 1501. When the journal out LBA and the journal-in LBA are equal to each other, it means that journal data is not stored in the primary journal.

The second storage device 20 that is equipped with the auxiliary journal stores a restoration completed LBA 1531 which is the highest LBA of the restoration completed region 1521, a to-be restored LBA 1532 which is the highest LBA of the restore in-progress region 1522, a read completed LBA 1533 which is the highest LBA of the read completed region 1523, and a to-be read LBA 1534 which is the highest LBA of the read in-progress region 1524.

In other words, when the restoration completed LBA 1531 and the to-be restored LBA 1532 are equal to each other, it means that a restoration processing instructed by the information processing device 11 has been completed. Also, when the read completed LBA 1533 and the to-be read LBA 1534 are equal to each other, it means that a journal acquisition processing instructed by the information processing device 10 has been completed.

The information processing device 11 can transmit to the first storage device 10 and the second storage device 20 a request to obtain the processing state of journal. Each of the storage devices 10 and 20 confirms the states of LBAs that indicate the boundaries of the regions described above, and responds to the request.

Also, since the storage devices 10 and 20 use the journal data regions cyclically as described above, regions that become unnecessary need to be released. The processing to release a region is called a "purge" processing. Each of the storage devices 10 and 20 can perform a purge processing by changing addresses of LBAs that indicate the boundaries of the regions. The first storage device 10 can purge the journal storage completed region 1502, among the journal storage completed regions 1502, 1503 and 1504 of the primary journal, which the second storage device 20 has completed acquiring the journal data into the auxiliary journal. In this case, the first storage device 10 changes the journal-out LBA 1511 to the head LBA of the journal storage completed region 1503, such that the journal storage completed region 1502 becomes the purge completed region 1501. The second storage device 20 treats the restoration completed region 1521 of the auxiliary journal as a region that is purged, and stores the journal data obtained in response to the journal acquisition instruction in the restoration completed region 1521.

Figure 16:
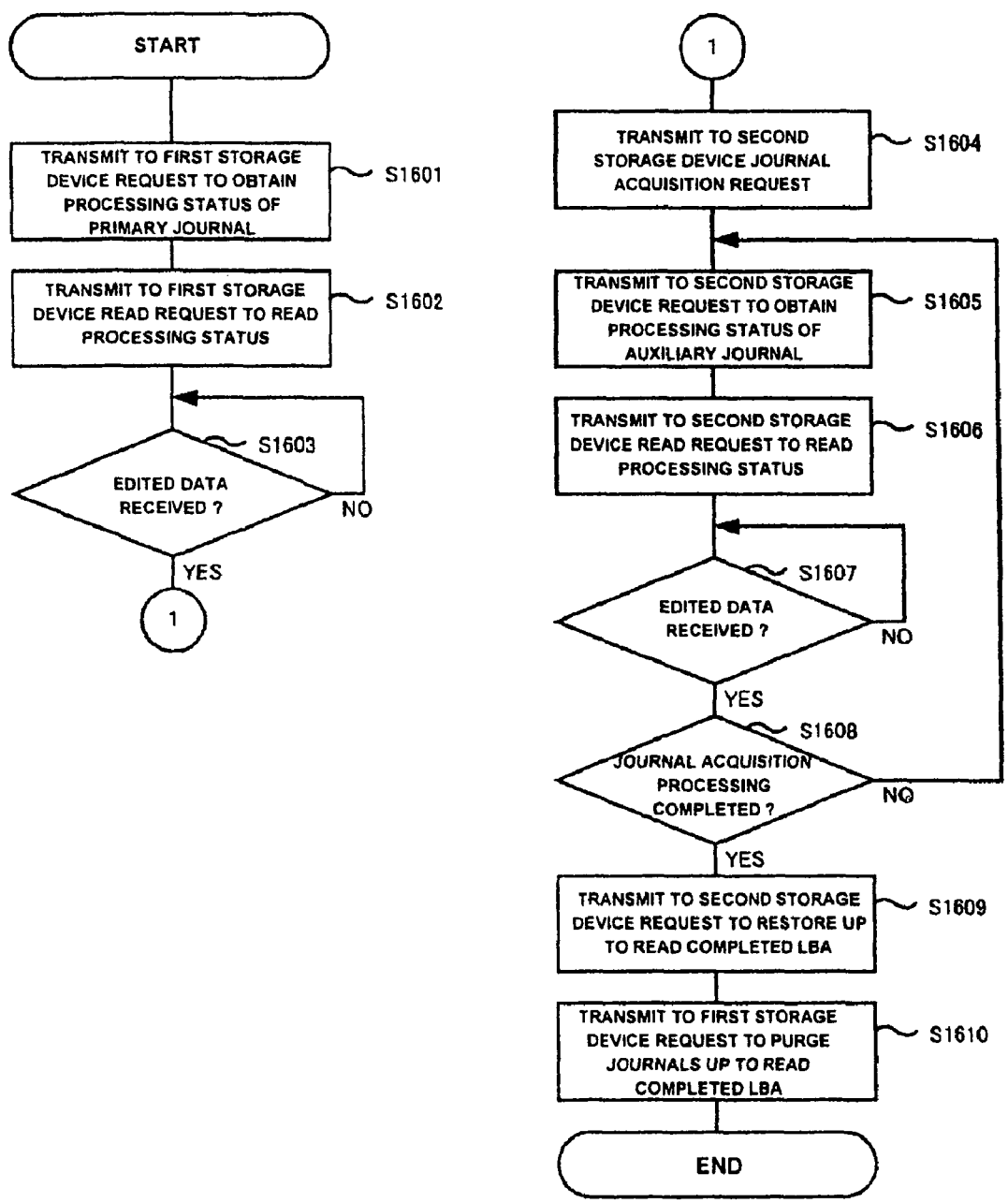
FIG. 16 shows a flowchart of a journal acquisition processing and a restore processing performed in information processing devices in accordance with an embodiment of the present invention.

Referring to a flowchart in FIG. 16, flows of the journal acquisition processing and the restoration processing will be described. The information processing device 11 transmits to the first storage device 10 a request to obtain the processing status of the primary journal (S1601). The information processing device 11 transmits to the first storage device 10 a read request to read edited data of a command device at which the processing status of the primary journal is set (S1602). Upon receiving the edited data of the command device from the first storage device 10 (S1603), the information processing device 11 transmits to the second storage device 20 a journal acquisition request to obtain journal data starting at the journal-out LBA 1511 to a LBA immediately before the journal-in LBA 1512 (S1604). The information processing device 11 transmits to the second storage device 20 a request to obtain the processing status of the auxiliary journal (S1605). The information processing device 11 transmits to the second storage device 20 a read request to read edited data of a command device at which the processing status of the auxiliary journal is set (S1606). Upon receiving the edited data of the command device from the second storage device 20 (S1607), the information processing device 11 compares the read completed LBA 1533 and the to-be read LBA 1534 set in the edited data, to confirm whether or not acquisition of the journal data has been completed (S1608). When the acquisition of the journal data has been completed, the information processing device 11 transmits to the second storage device 20 a restore request to restore journal data up to the read completed LBA 1533 (S1609). Then, the information processing device 11 transmits to the first storage device 10 a purge request to purge the journal data up to the read completed LBA 1533 (S1610). The information processing device 11 repeats the journal acquisition processing and restoration processing.

By the processings described above, updated data in a storage device at a primary site can be reflected on a storage device at a remote site without performing data communications between multiple information processing devices, and without adding new commands to the operating system of the information processing devices. It is noted that, with an instruction from the information processing device 11 that is communicatively connected to a storage device at a remote site, the storage device at the remote site can obtain journal data from a storage device at a primary site and restore the data.

[Swap]

Let us assume that a primary volume of the first storage device 10 and an auxiliary volume of the second storage device 20 form a pair by an instruction from an information processing device 11 (hereafter referred to as a "first information processing device") that is communicatively connected to the first storage device 10. In this case, if a failure occurs in the first information processing device 10, an information processing device 11 (hereafter referred to as a "second information processing device") that is communicatively connected to the second storage device 20 can continue processings that have been performed by the first information processing device, using the auxiliary volume of the pair. In this instance, the second information processing device switches the relation between the primary volume and the auxiliary volume. In other words, a pair is formed with the logical volume 209 of the second storage device 20 being a primary volume and the logical volume 209 of the first storage device 10 being an auxiliary volume. Such a processing to switch the pair relation is called a "swap" processing.

Figure 17:
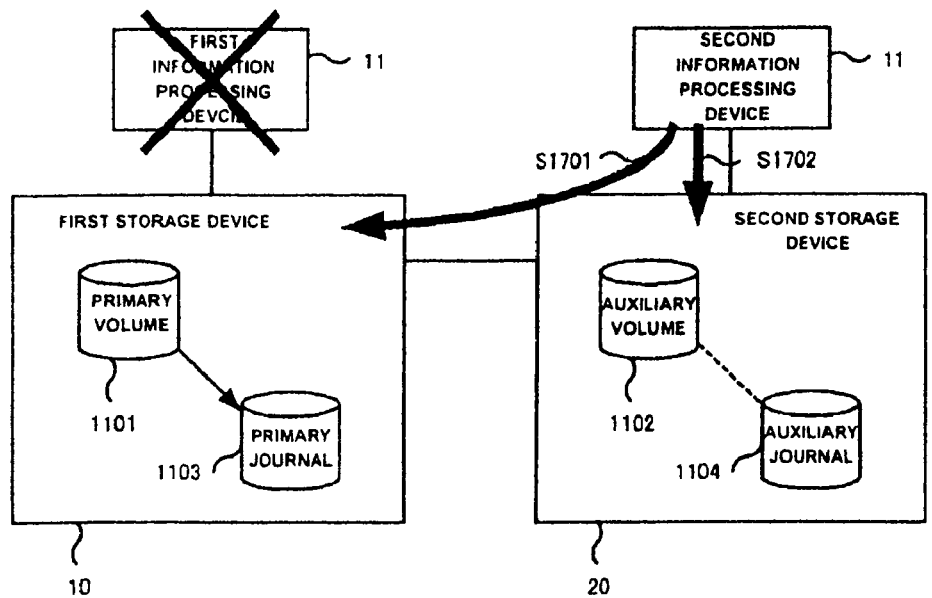
FIG. 17 is a schematic diagram illustrating a swap processing in accordance with an embodiment of the present invention.
Figure 18:
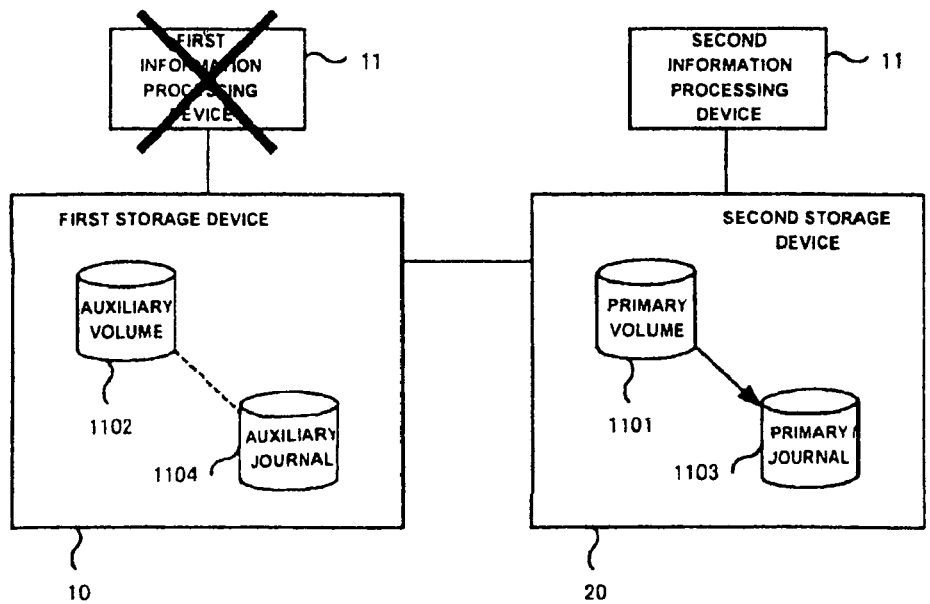
FIG. 18 is a schematic diagram illustrating a state in which the swap processing of the present embodiment is completed.

Referring to FIGS. 17 and 18, a flow of processings to swap a pair will be described. As shown in FIG. 17, the second information processing device 11 transmits a pair swap instruction to the first storage device 10 and the second storage device 20 (S1701, S1702). Upon receiving the pair swap instruction, the journal stop section of the first storage device 10 stops storing journals in the primary volume. Also, the pair management section 704 of the first storage device 10 swaps the primary volume and the auxiliary volume registered in the pair management table 1001. Similarly, the pair management section 704 of the second storage device 20 swaps the primary volume and the auxiliary volume registered in the pair management table 1001. The journal storage section 707 of the second storage device 20 starts storing journals of the logical volume 209 of the second storage device 20, which defines the primary volume.

FIG. 18 shows a state in which a pair is formed with the logical volume 209 of the second storage device 20 being the primary volume and the logical volume 209 of the first storage device 10 being the auxiliary volume, as a result of the swap processing performed by the first storage device 10 and the second storage device 20 which received the pair swap instruction.

Figure 19:
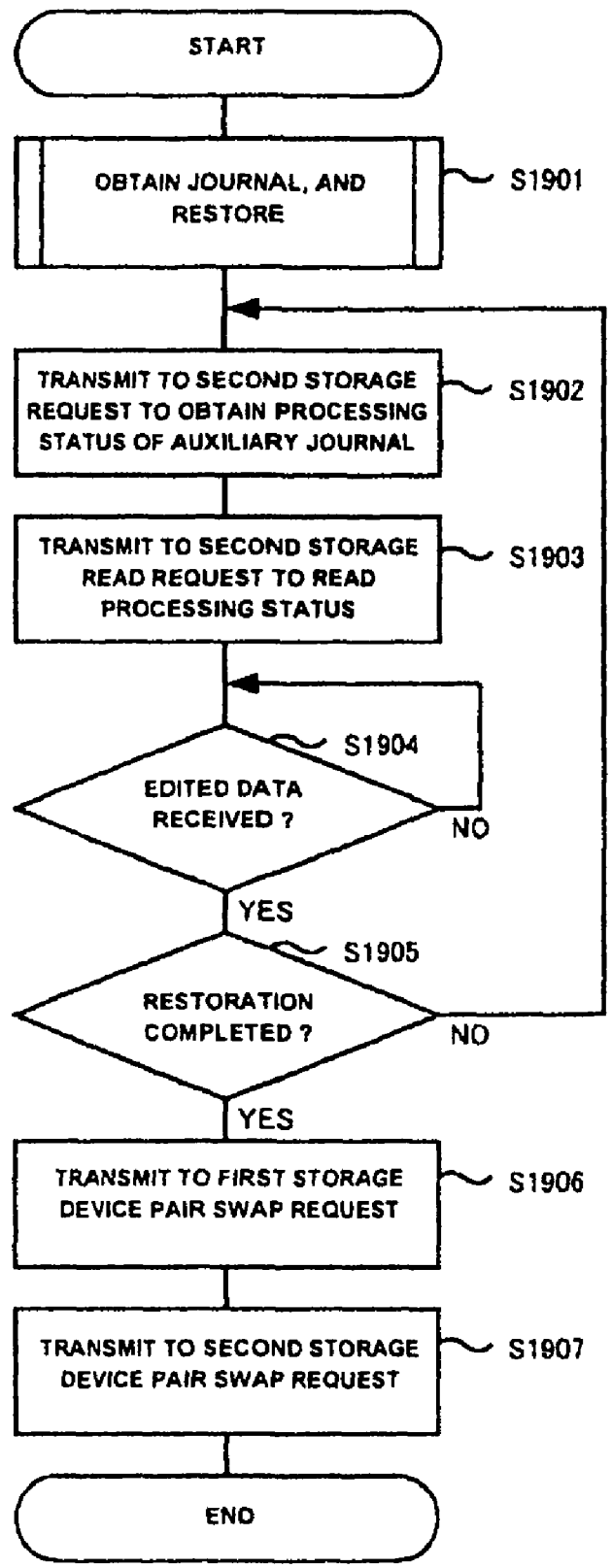
FIG. 19 shows a flowchart of a swap processing in a second information processing device in accordance with an embodiment of the present invention.
Figure 20:
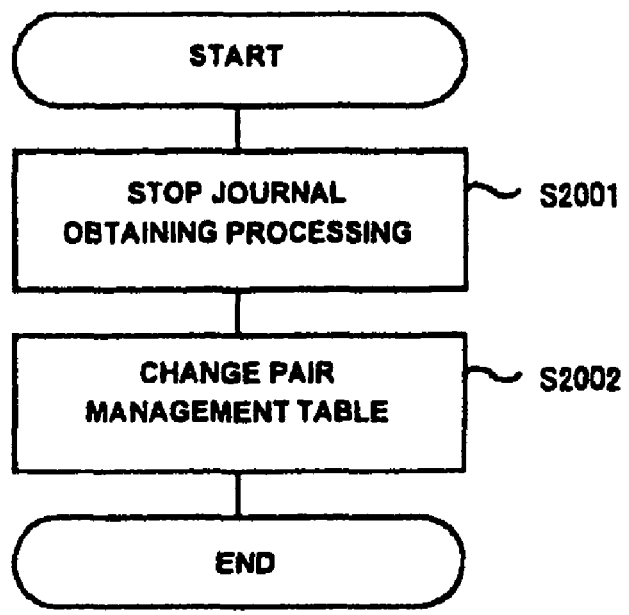
FIG. 20 shows a flowchart of a swap processing in a first storage device in accordance with an embodiment of the present invention.
Figure 21:
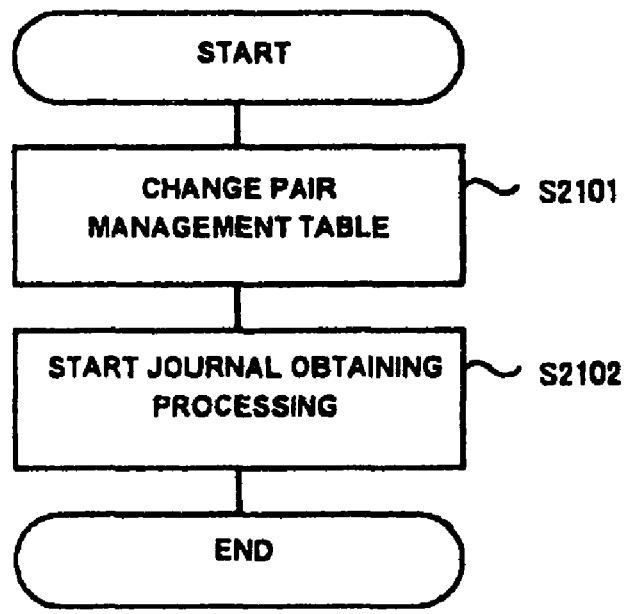
FIG. 21 shows a flow chart of a swap processing in a second storage device in accordance with an embodiment of the present invention.

The swap processing performed by the second information processing device 20 and the storage devices 10 and 20 will be described in detail with reference to flowcharts in FIGS. 19 through 21. The second information processing device executes the journal acquisition processing and the restoration processing described above (S1901). The second information processing device transmits to the second storage device 20 a request to obtain the processing status of the auxiliary journal (S1902). The second information processing device transmits to the second storage device 20 a read request to read edited data of a command device in which the processing status of the auxiliary journal is set (S1903). Upon receiving the edited data of the command device from the second storage device 20 (S1904), the second information processing device compares the restoration completed LBA 1531 and the to-be restored LBA 1532 set in the edited data, to confirm if the restoration processing has been completed (S1905). If the restoration has been completed, the second information processing device transmits a pair swap request to the first storage device 10 and the second storage device 20 (S1906, S1907). Upon receiving the pair swap request, the first storage device 10 stops its journal acquisition processing with respect to the primary volume (S2001), and swaps the relation between the copy source and the copy destination registered in the pair management table 1001 (S2002). Also, the second storage device 20, that has received the pair swap request, swaps the relation between the copy source and the copy destination registered in the pair management table 1001 (S2101), and starts a journal acquisition processing with respect to the primary volume of the second storage device 20 (S2102).

Let us consider as an example an information processing system that is composed of a primary site and a remote site. The primary site is equipped with a first information processing device and a first storage device 10, and the remote site is equipped with a second information processing device and a second storage device 20. When a failure occurs in the first information processing device, the second information processing device uses the second storage device 20 to continue primary processings performed at the primary site. The second information processing device may instruct the first storage device 10 and the second storage device 20 to execute the swap instruction described above, such that the second storage device 20 is used for the primary processings, and data on the second storage device 20 can be stored as a backup in the first storage device 10. Furthermore, since the data on the second storage device 20 is stored as a backup in the first storage device 10, the execution of the primary processings can be quickly switched to the primary site, when the first information processing device is recovered from the failure.

Also, since the pair swap instructions from the information processing device 11 to the storage devices 10 and 20 are provided using read/write commands with which the information processing device 11 is equipped, there is no need to add new commands to the operating system on the information processing device 11.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for controlling a storage device system, the storage device system including:
an information processing device,
a first storage device equipped with a first storage volume, and a second storage device equipped with a second storage volume, wherein the information processing device and the first storage device are communicatively connected to one another,
the first storage device and the second storage device are communicatively connected to one another,
the information processing device is equipped with a first write request section that requests to write data in the first storage device according to a first communications protocol, and
the first storage device is equipped with a second write request section that requests to write data in the second storage device according to a second communications protocol,
the method comprising:
a step conducted by the information processing device of creating first data including a first instruction to be executed in the second storage device;
a step conducted by the information processing device of transmitting to the first write request section a request to write the first data in the first storage volume according to the first communications protocol;
a step conducted by the first storage device of, when the first data written in the first storage volume is an instruction to the second storage device, transmitting to the second write request section a request to write the first data in the second storage volume according to the second communications protocol;
a step conducted by the second storage device of executing the first instruction set in the first data written in the second storage volume;

a step conducted by the information processing device of creating second data including a second instruction to be executed by the first storage device;

a step conducted by the information processing device of transmitting to the first write request section a request to write the second data in the first storage volume according to the first communications protocol; and a step conducted by the first storage device of, when the second data written in the first storage volume is an instruction to the first storage device, executing the second instruction.

2. A method for controlling a storage device system according to claim 1, wherein the first storage device includes a third storage volume, the second storage device includes a fourth storage volume, and the second storage device includes a read request section that requests the first storage device to read data according to a third communications protocol, the method further comprising:

a step conducted by the information processing device of creating the first data including as the first instruction a pair forming instruction to form a pair of the third storage volume as being a primary storage volume and the fourth storage volume as being an auxiliary storage volume; and a step conducted by the second storage device of receiving the pair forming instruction set in the first data written in the second storage volume, and transmitting to the read request section a request to read data in the third storage volume and write the data into the fourth storage volume according to the third communications protocol.

3. A method for controlling a storage device system according to claim 2, wherein the first storage device includes a fifth storage volume, and the second storage device includes a sixth storage volume, wherein a pair is formed with the third storage volume as being a primary storage volume and the fourth storage volume as being an auxiliary storage volume, and a copy of data to be written in the third storage volume and positional information of the data are stored in the fifth storage volume as a journal, the method further comprising:

a step conducted by the information processing device of creating the first data including as the first instruction a journal acquisition instruction to store a copy of the journal into the sixth storage volume; and a step conducted by the second storage device of receiving the journal acquisition instruction set in the first data written in the second storage volume, and transmitting to the read request section a request to read data in the fifth storage volume and write the data into the sixth storage volume according to the third communications protocol.

4. A method for controlling a storage device system according to claim 3, further comprising:

a step conducted by the information processing device of creating the first data including as the first instruction a restoration instruction to update the fourth storage volume using a journal stored in the sixth storage volume; and a step conducted by the second storage device of receiving the restoration instruction set in the first data written in the second storage volume, and writing data stored in the journal written in the sixth storage volume into the fourth storage volume.

5. A method for controlling a storage device system according to claim 1, wherein the first storage includes a third storage volume, and the second storage device includes a fourth storage volume and a sixth storage volume, the method further comprising:

a step conducted by the information processing device of creating the first data including as the first instruction a pair forming instruction to form a pair of the third storage volume as being an auxiliary storage volume and the fourth storage volume as being a primary storage volume; and a step conducted by the second storage device of receiving the pair forming instruction set in the first data written in the second storage volume, and storing in the sixth storage volume a copy of data to be written in the fourth storage volume and positional information of the data as a journal.

6. A method for controlling a storage device system according to claim 5, further comprising a step conducted by the second storage device of storing pair management information indicating that the pair is formed with the third storage volume as being an auxiliary storage volume and the fourth storage volume as being a primary storage volume.

7. A method for controlling a storage device system according to claim 6, further comprising:

a step conducted by the information processing device of creating the first data including as the first instruction a pair swap instruction to swap the pair such that the third storage volume is set as a primary storage volume and the fourth storage volume is set as an auxiliary storage volume;

a step conducted by the second storage device of receiving the pair swap instruction set in the first data written in the second storage volume, and storing in the pair management information data indicating that the third storage volume is the primary storage volume and the fourth storage volume is the auxiliary storage volume; and a step conducted by the second storage device of receiving the pair swap instruction, and stopping the step of storing in the sixth storage volume history of data written in the fourth storage volume as a journal.

8. A storage device system comprising:

an information processing device;

a first storage device equipped with a first storage volume; and a second storage device equipped with a second storage volume wherein the information processing device and the first storage device are communicatively connected to one another, the first storage device and the second storage device are communicatively connected to one another, the information processing device is equipped with a first write request section that requests to write data in the first storage device according to a first communications protocol, the first storage device is equipped with a second write request section that requests to write data in the second storage device according to a second communications protocol, the information processing device is equipped with an instruction setting section that creates first data including a first instruction to be executed in the second storage device, and an instruction transmission section that transmits to the first write request section a request to write the first data in the first storage volume according to the first communications protocol, the first storage device is equipped with a data transfer section that, when the first data written in the first storage volume is an instruction to the second storage device, transmits to the second write request section a request to write the first data in the second storage volume according to the second communications protocol, and the second storage device is equipped with an instruction execution section that executes the first instruction set in the first data written in the second storage volume, and wherein the information processing device is equipped with the instruction setting section that creates second data including a second instruction to be executed by the first storage device, the information processing device is equipped with the instruction transmission section that transmits to the first write request section a request to write the second data in the first storage volume according to the first communications protocol, and the first storage device is equipped with a first instruction execution section that, when the second data written in the first storage volume is an instruction to the first storage device, executes the second instruction.

9. A storage device system according to claim 8, wherein the first storage device is equipped with a third storage volume, the second storage device is equipped with a fourth storage volume, the second storage device is equipped with a read request section that requests the first storage device to read data according to a third communications protocol, the information processing device is equipped with the instruction setting section that creates the first data including as the first instruction a pair forming instruction to form a pair of the third storage volume as being a primary storage volume and the fourth storage volume as being an auxiliary storage volume, and the second storage device is equipped with a copy forming section that receives the pair forming instruction set in the first data written in the second storage volume, and transmits to the read request section a request to read data in the third storage volume and write the data into the fourth storage volume according to the third communications protocol.

10. A storage device system according to claim 9, wherein the first storage device is equipped with a fifth storage volume, the second storage device is equipped with a sixth storage volume, wherein a pair is formed with the third storage volume as being a primary storage volume and the fourth storage volume as being an auxiliary storage volume, and a copy of data to be written in the third storage volume and positional information of the data are stored in the fifth storage volume as a journal, the information processing device is equipped with the instruction setting section that creates the first data including as the first instruction a journal acquisition instruction to store a copy of the journal into the sixth storage volume, and the second instruction execution section is equipped with a journal acquisition section that receives the journal acquisition instruction set in the first data written in the second storage volume, and transmits to the read request section a request to read data in the fifth storage volume and write the data into the sixth storage volume according to the third communications protocol.

11. A storage device system according to claim 10, wherein the information processing device is equipped with the instruction setting section that creates the first data including as the first instruction a restoration instruction to update the fourth storage volume using a journal stored in the sixth storage volume, and the second instruction execution section is equipped with a restoration section that receives the restoration instruction set in the first data written in the second storage volume, and writes data stored in the journal written in the sixth storage volume into the fourth storage volume.

12. A storage device system according to claim 8, wherein the first storage is equipped with a third storage volume, the second storage device is equipped with a fourth storage volume and a sixth storage volume, the information processing device is equipped with the instruction setting section that creates the first data including as the first instruction a pair forming instruction to form a pair of the third storage volume as being an auxiliary storage volume and the fourth storage volume as being a primary storage volume, and the second storage device is equipped with a journal storage section that receives the pair forming instruction set in the first data written in the second storage volume, and stores in the sixth storage volume a copy of data written in the fourth storage volume and positional information of the data as a journal.

13. A storage device system according to claim 12, wherein the second storage device is equipped with a pair management section that stores pair management information indicating that the pair is formed with the third storage volume as being an auxiliary storage volume and the fourth storage volume as being a primary storage volume.

14. A storage device system according to claim 13, wherein the information processing device is equipped with the instruction setting section that creates the first data including as the first instruction a pair swap instruction to swap the pair such that the third storage volume is set as a primary storage volume and the fourth storage volume is set as an auxiliary storage volume, the second instruction execution section is equipped with the pair management section that receives the pair swap instruction set in the first data written in the second storage volume, and stores in the pair management information data indicating that the third storage volume is the primary storage volume and the fourth storage volume is the auxiliary storage volume, and the second storage device is equipped with a journal stop section that receives the pair swap instruction, and stops a processing to store in the sixth storage volume history of data written in the fourth storage volume as a journal.

15. A method for controlling a storage device system, the storage device system including:

an information processing device, a first storage device equipped with a first storage volume, and a second storage device equipped with a second storage volume, wherein the information processing device is equipped with a first write request section that requests to write data in the first storage device according to a first communications protocol, and the first storage device is equipped with a second write request section that requests to write data in the second storage device according to a second communications protocol, the method comprising:

a step of creating first data including a first instruction to be executed by the second storage device;

a step of transmitting to the first write request section a request to write the first data in the first storage volume according to the first communications protocol;

a step of, when the first data written in the first storage volume is an instruction to the second storage device, transmitting to the second write request section a request to write the first data in the second storage volume according to the second communications protocol;

a step of executing the first instruction set in the first data written in the second storage volume;

a step of creating second data including a second instruction to be executed by the first storage device;

a step of transmitting to the first write request section a request to write the second data in the first storage volume according to the first communications protocol; and a step of, when the second data written in the first storage volume is an instruction to the first storage device, executing the second instruction.

16. A method for controlling a storage device system according to claim 15, wherein the first storage device includes a third storage volume, the second storage device includes a fourth storage volume, and the second storage device includes a read request section that requests the first storage device to read data according to a third communications protocol, the method further comprising:

a step of creating the first data including as the first instruction a pair forming instruction to form a pair of the third storage volume as being a primary storage volume and the fourth storage volume as being an auxiliary storage volume; and a step of receiving the pair forming instruction set in the first data written in the second storage volume, and transmitting to the read request section of the second storage device a request to read data from the third storage volume and write the data in the fourth storage volume according to the third communications protocol.

17. A method for controlling a storage device system according to claim 16, wherein the first storage device includes a fifth storage volume, and the second storage device includes a sixth storage volume, wherein a pair is formed with the third storage volume as being a primary storage volume and the fourth storage volume as being an auxiliary storage volume, and a copy of data to be written in the third storage volume and positional information of the data are stored in the fifth storage volume as a journal, the method further comprising:

a step of creating the first data including as the first instruction a journal acquisition instruction to store a copy of the journal into the sixth storage volume; and a step of receiving the journal acquisition instruction set in the first data written in the second storage volume, and transmitting to the read request section of the second storage device a request to read data in the fifth storage volume and write the data in the sixth storage volume according to the third communications protocol.

18. A method for controlling a storage device system according to claim 17, further comprising:

a step of creating the first data including as the first instruction a restoration instruction to update the fourth storage volume using a journal stored in the sixth storage volume; and a step of receiving the restoration instruction set in the first data written in the second storage volume, and writing data stored in the journal written in the sixth storage volume into the fourth storage volume.

19. A method for controlling a storage device system according to claim 15, wherein the first storage includes a third storage volume, and the second storage device includes a fourth storage volume and a sixth storage volume, the method further comprising:

a step of creating the first data including as the first instruction a pair forming instruction to form a pair of the third storage volume as being an auxiliary storage volume and the fourth storage volume as being a primary storage volume; and a step of receiving the pair forming instruction set in the first data written in the second storage volume, and storing in the sixth storage volume a copy of data to be written in the fourth storage volume and positional information of the data as a journal.

20. A method for controlling a storage device system according to claim 19, further comprising a step of storing pair management information indicating that the pair is formed with the third storage volume as being an auxiliary storage volume and the fourth storage volume as being a primary storage volume.

21. A method for controlling a storage device system according to claim 20, further comprising:

a step of creating the first data including as the first instruction a pair swap instruction to swap the pair such that the third storage volume is set as a primary storage volume and the fourth storage volume is set as an auxiliary storage volume;

a step of receiving the pair swap instruction set in the first data written in the second storage volume, and storing in the pair management information data indicating that the third storage volume is the primary storage volume and the fourth storage volume is the auxiliary storage volume; and a step of receiving the pair swap instruction, and stopping the step of storing in the sixth storage volume history of data written in the fourth storage volume as a journal.

* * * * *